(12) United States Patent
Russegger et al.

(10) Patent No.: US 7,964,825 B2
(45) Date of Patent: Jun. 21, 2011

(54) METHOD FOR THE ATTACHMENT OF AN ELECTRICAL LEAD WIRE ON A SURFACE ELEMENT, AS WELL AS A HEATING ELEMENT, ESPECIALLY FOR A PLASTIC-SPRAYING DEVICE

(75) Inventors: Elias Russegger, Golling (AT); Reinhardt W. Lehnert, Ubstadt-Weiher (DE)

(73) Assignee: Watlow Electric Manufacturing Company, St. Louis, MO (US)

( * ) Notice: Subject to any disclaimer, the term of this patent is extended or adjusted under 35 U.S.C. 154(b) by 1152 days.

(21) Appl. No.: 10/580,726

(22) PCT Filed: Nov. 24, 2004

(86) PCT No.: PCT/US2004/039956
§ 371 (c)(1),
(2), (4) Date: Feb. 23, 2007

(87) PCT Pub. No.: WO2005/053361
PCT Pub. Date: Jun. 9, 2005

(65) Prior Publication Data
US 2007/0138165 A1    Jun. 21, 2007

(30) Foreign Application Priority Data
Nov. 25, 2003  (DE) .................................. 103 55 043

(51) Int. Cl.
*H05B 3/40* (2006.01)
*H01R 4/18* (2006.01)

(52) U.S. Cl. ........ 219/534; 219/541; 219/543; 219/528; 219/549; 439/865; 425/549; 425/562; 425/563; 425/564; 425/566; 338/306; 338/308

(58) Field of Classification Search .................. 219/534, 219/541, 543, 528, 549; 439/865; 425/549, 425/562–4, 566, 572; 338/306, 308
See application file for complete search history.

(56) References Cited

U.S. PATENT DOCUMENTS
5,110,034 A * 5/1992 Simmonds ................. 228/179.1
(Continued)

FOREIGN PATENT DOCUMENTS
DE   10201940   7/2003
(Continued)

OTHER PUBLICATIONS
International Preliminary Report on Patentability, mailed date Jun. 8, 2006.
(Continued)

*Primary Examiner* — Shawntina Fuqua
(74) *Attorney, Agent, or Firm* — Brinks Hofer Gilson & Lione

(57) ABSTRACT

An apparatus and methods for attaching electrical leads (22, 24) to a heating layer (16) of a heater are provided. An attachment material (50) is thermally sprayed over cords (32) of the electrical leads (22, 24), which are in contact with the heating layer (16) over a contact area (20). The attachment material (50) and the heating layer 16 are further thermally sprayed with a layer (52), which is an isolating material. The thermal sprayed connection between the electrical leads (22, 24) and the heating layer (16) thus provides more intimate contact and an improved electrical connection.

11 Claims, 10 Drawing Sheets

U.S. PATENT DOCUMENTS

Figure 1:
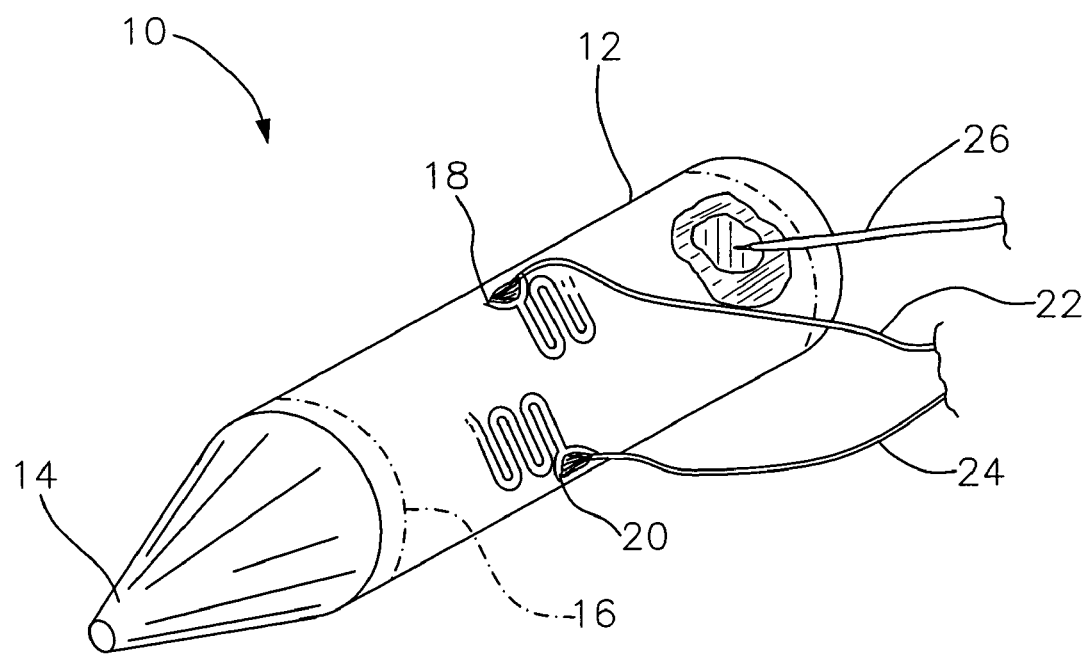

| | | |
|---|---|---|
| 5,843,495 A | 12/1998 | Yamada |
| 6,099,974 A | 8/2000 | Lenling |

FOREIGN PATENT DOCUMENTS

| | | |
|---|---|---|
| DE | 10201940 A1 | 7/2003 |
| EP | 0262833 | 4/1988 |
| EP | 0262833 A2 | 12/1998 |
| EP | 1 719 387 B1 | 11/2004 |
| WO | WO99/40039 | 8/1999 |
| WO | WO 99/40039 A1 | 8/1999 |
| WO | 00/07850 | 2/2000 |
| WO | WO03/052776 | 6/2003 |
| WO | WO 03/052776 A2 | 6/2003 |

OTHER PUBLICATIONS

International Search Report for PCT/US2004/039956, mailed date May 13, 2005.
International Search Report (PCT/US2004/039956) 4 pages.
International Preliminary Examination Report (PCT/US2004/039956) 6 pages.

* cited by examiner

METHOD FOR THE ATTACHMENT OF AN ELECTRICAL LEAD WIRE ON A SURFACE ELEMENT, AS WELL AS A HEATING ELEMENT, ESPECIALLY FOR A PLASTIC-SPRAYING DEVICE

STATE OF THE ART

The invention deals foremost with a procedure for the attachment of an electrical conductor to a surface element.

Such a procedure is for example well-known from DE 198 10 848 A1. In that publication a heating element is published, this was used for the heating of a rear view mirror of motor vehicles. The heating element consists of a conductive strip, which by means of arc or plasma spraying procedures is applied on a base surface. At the ends of the conductive strip contact points are available, to which the connecting leads can be soldered to. The appropriate soldered connections build, however, relatively thick, so that at least in the region of the contact points a certain space demand is necessary. Furthermore, the production of such soldered connections is comparatively expensive and the use of ordinary soldering materials limits the temperature tolerance in the device.

From DE 195 38 686 A1 an electrical resistance heater is well-known, where a heating layer is created from a mixture of graphite particles and a bonding agent which is sprayed on a base surface. The connection of the in this manner manufactured heating layer with a current supply is made by electrodes, which are formed from a metal band or for a metal foil. Here the disadvantage is, that such metal bands or foils must be build relatively large in order to make an acceptable transition resistance possible, thus within the region of the contact points much place is needed.

The invention at hand has therefore the task, to develop the initially specified art in such a way, that an electrical conductor with as little space demand as possible and with small cost to can be fastened to a surface element.

This task is first solved with a procedure of the initially mentioned art with a procedure which covers the following steps:
  A. first an attachment region of the conductor is placed at least indirectly next to the surface element;
  B. then the attachment region which is placed at least indirectly to the surface element of the conductor and a directly next to the attachment region placed region of the surface element is thermally sprayed over with an attachment material.

A further solution consists of one which covers a procedure containing the following steps:
  A. on a region of the surface element a contact material is thermally sprayed on so that a contact point is manufactured;
  B. an attachment region (33) of the conductor (24; 26) is welded onto the contact point by using an attachment material.

ADVANTAGES OF THE INVENTION

With the first mentioned procedure according to invention the attachment of the electrical conductor to the surface element takes place by only using a very small amount of material, as is only possible when thermal spraying. With this procedure usually a powder material is sprayed on the surface element first. Thereby a continuous however very thin layer forms, on the attachment region of the conductor and that directly next to it placed surface element. This layer is on the one hand intimately connected with the surface element and on the other hand with the attachment region of the conductor and leads so to the attachment of the conductor at the surface element. Space demand for the attachment is that way essentially determined only by the dimensions of the attachment region of the electrical conductor certainly and can therefore be relatively small.

Depending upon what kind of thermal spray procedure it can additionally lead to melting on the material of its electrical conductor within the attachment region and/or of the material at the exposed surface of the surface element. Thereby a more intimate contact between the electrical conductor and the surface element is creates, which leads to a safe attachment of the electrical conductor at the surface element.

With the secondly mentioned procedure a higher material demand is necessary, the mechanical connections is however still loadable and exhibits therefore a long life span. The production of the contact points through thermal spraying makes an even material distribution possible and prevents damage at the surface element. Here it is understood, that the term is not meant as point of material in the mathematical sense, but a material collection with comparatively little expansion.

Favorable developments of the invention are indicated in sub/dependent-claims.

First, relative to the second procedure it is suggested, that the attachment region to the contact points ought to be by means of ultrasonic welding. There mechanical oscillations are transmitted to connecting parts. By reflection of the mechanical oscillations at the sound-radiating end-surfaces a Sonotrode, a standing wave, forms the energy transfers into the work pieces, which a causes welding by internal friction. This is inexpensive and can be used also with sensitive materials. Beyond that an additional attachment material can be omitted, which is necessary with ordinary welding methods. In all other respects, it also in the context of the invention at hand, that the attachment region is welded directly, thus without edge contact points before, to the surface element using ultrasound.

Furthermore it is possible, that the surface element covers an electrical conductive layer, preferably a heating layer or a cooling layer and that the attachment region of the electrical conductor is in connection with an electrical layer. These procedures according to the invention lead to a space saving electrical contact with small transfer resistance.

The electrically conductive layer is preferably also applied by thermal spraying and can afterwards by regionally removed from the layer which at first does not exhibit the desired form. An appropriate procedure is revealed in DE 101 62 276 A1, which's contents are expressly also revealed as part of the present publication.

In further development for this it is suggested, that the attachment and/or contact material, which is thermally sprayed and/or welded, exhibits relative to the electrically conductive layer a higher, preferably at least fivefold, or even stronger, at least tenfold the electrical conductivity. That way one avoids that if the electrically conductive layer over the conductor has a current, in the region of the contact of the electrical conductor with the electrically conductive layer that it leads to an increased local temperature, which could damage the electrically conductive layer and/or attachment material. In particular then, if the electrically conductive layer serves as a heating layer, one can by this measure keep the temperatures in the region of the attachment of the electrical conductor to the heating layer comparatively low, which extends the life span of the manufactured device. In the procedure mentioned second the contact material and the attachment mounting material can be identical.

A modified execution form plans, that the surface element an electrically leading layer covers preferably a heating layer and that before step A on the electrically conductive layer an electrically isolating layer is applied, preferably thermal sprayed, and that the conductor is a thermal-element. Through the isolation a short-circuit between the electrically conductive layer and the thermal-element is avoided. with the attachment of the thermal-element by thermal spraying high temperature-utilization (until 600 degrees Celsius) is made possible. Because of the isolating layer which is indirect, but ultimately however still comparatively direct placement of the thermo-element on the electrically conductive layer temperature collection exhibits a very good dynamic. If the surface element is a heating layer, nearly no delayed-action of the temperature regulation of the heating layer is present.

In order to be sure, that the attachment and/or contact material only sprays on where the attachment of the leader actually take place, it is suggested that before thermal spraying the attachment and/or the contact material, the region directly next to the attachment region and/or region of the surface element contact point be covered. If the surface element is a tubing element, a two piece pipe clip can be used, which on the to each other turned edges, on which the electrical conductor is to be placed on the surface element, exhibit an appropriate recess.

The procedure according to invention is suitable particularly well when the attachment region of the electrical conductor covers a cord of an electrical cable, one lug, a vein end sleeve, a connector lug of a plug or pin, or a spot-weld one thermal-element.

A further favorable embodiment procedure is characterized by that, the thermal spraying procedure comprises plasma spraying. With plasma spraying high temperatures can be reached, which allows the use of high temperature attachment materials. However, still different thermal spraying procedures can be used in addition.

For the protection of the attachment region of the electrical conductor and the sprayed on attachment material in the above first mentioned procedure it is suggested that after the step b) an electrical isolating layer, which preferably covers ceramic or plastic, is at least thermal sprayed on the attachment region and the directly adjacent region of the surface element.

Similarly for the above second mentioned procedure suggests, it is suggested that before step b) an electrically isolating layer, which preferably covers ceramic or plastic is thermal sprayed on the surface element and the contact points, and also likewise before step b) the isolating layer at least regionally sprayed on isolation layer on the contact points is removed, preferably sanded off. This permits application of an isolation- and protection layer, as long as no interfering cables are present.

In further development it is also mentioned, that after step b) the contact points and the to it fastened attachment region with an electrically is provided with an isolating material, preferably to be poured. Thus the contact point is likewise completely isolated and protected.

Furthermore certainly one suggests that at least electrically isolating layer of Al2O3 covers the surface element with the austenitic nickel based alloy, the attachment region of the electrical conductor's pure nickel, and/or the attachment material's copper.

The invention deals also a hot channel element, especially for a plastic spraying mechanism, with a tubular base piece, one on the base piece sprayed heating layer, and at least an electrical conductor.

It is suggested, that an attachment region of the electrical leader is at least indirectly fastened to the heating layer through, that it and a directly adjacent to attachment region placed region are thermal sprayed with an attachment material.

Alternatively one suggests, that it covers a thermal sprayed contact point, which is thicker than the surface element and to which an attachment region of the electrical conductor is welded onto.

With a hot channel element for one plastic spraying device those above in relation to the invention specific procedures become especially effective, because particularly a plastic spraying device usually only little space is available for the spraying nozzles. thanks to this procedure according to invention only little space is needed for the attachment of the electrical conductor at the thermal sprayed heating layer. An additional isolation from plastic or silicone is not needed. Furthermore, high temperature-application (up to 600 degrees Celsius) is possible, and due to thermal spraying the electrical conductor clings well on the surface element, which benefits its life span.

One suggests that the electrical conductor covers a connection element of the current supply of the heating layer, and that its attachment region is connected electrically with the heating layer. That way the embodiment of the hot channel element according to invention reaches a very good efficiency, since due to the thermal spraying a small transfer resistance can be obtained between the connection element and the electrical heating layer.

Furthermore, the electrical conductor may cover a thermal-element, whereby between the thermal-element and heating layer an electrically isolating layer is present. The indirect, however, nevertheless relatively direct contact of the thermal-element with the electrical heating layer of the thermal-element the temperature of the heating layer is captured very well and with a very high dynamic, which facilitates the set-up of the desired temperature of the heating layer.

Furthermore, the hot channel element may cover a strain relief element and the electrical conductor can be clamped between the strain relief element and surface element. This relieves the actual junction point and increases that way the reliability of the hot channel element.

DRAWINGS

Figure 2:
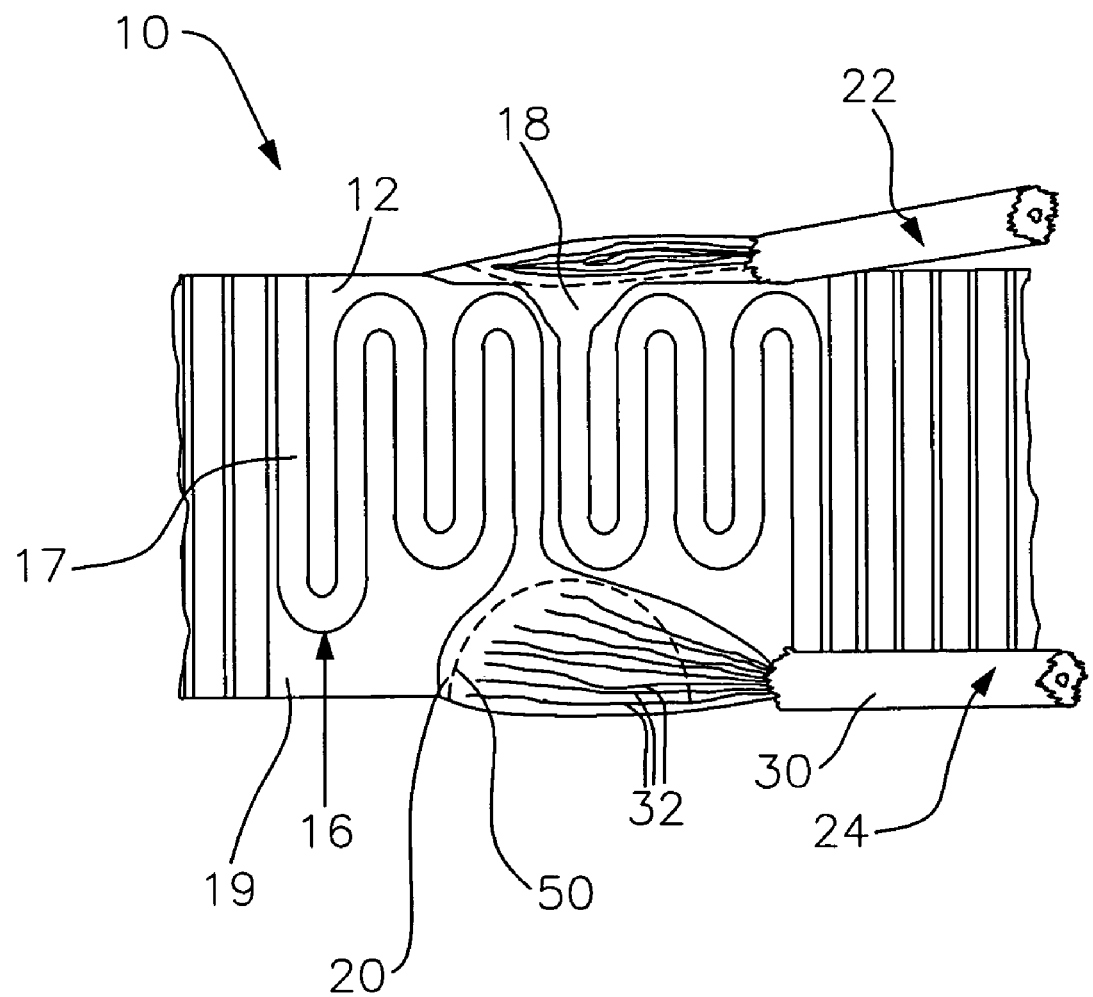
Figure 3:
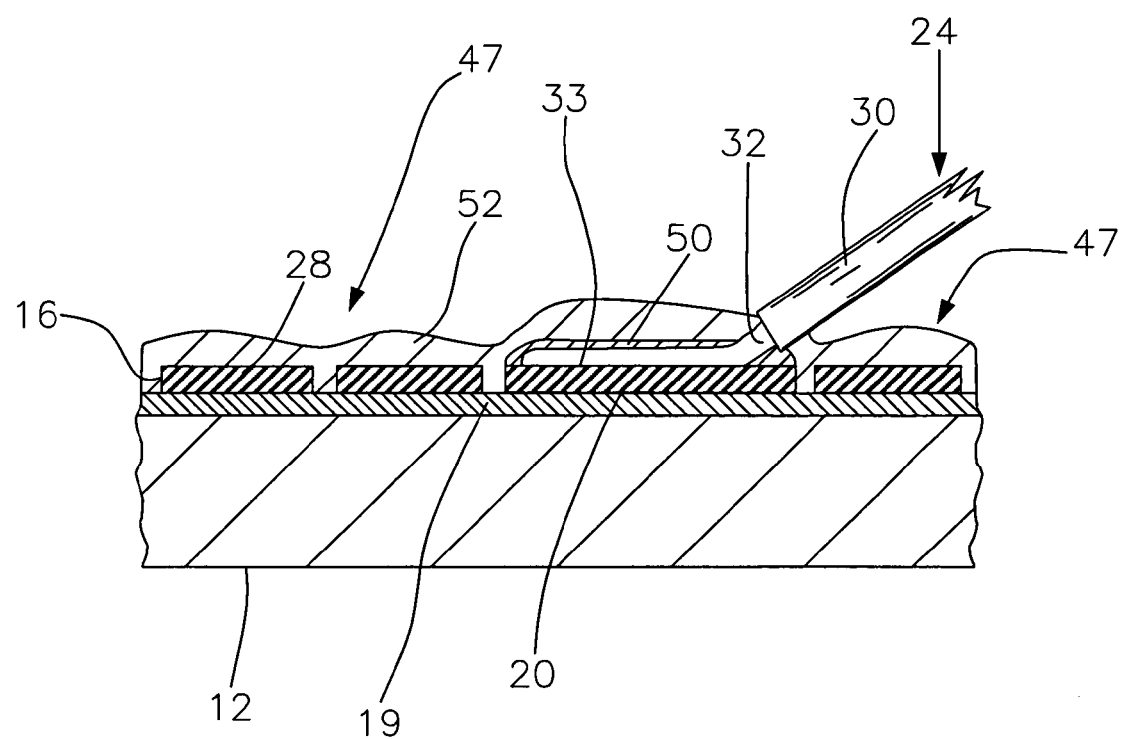
Figure 4:
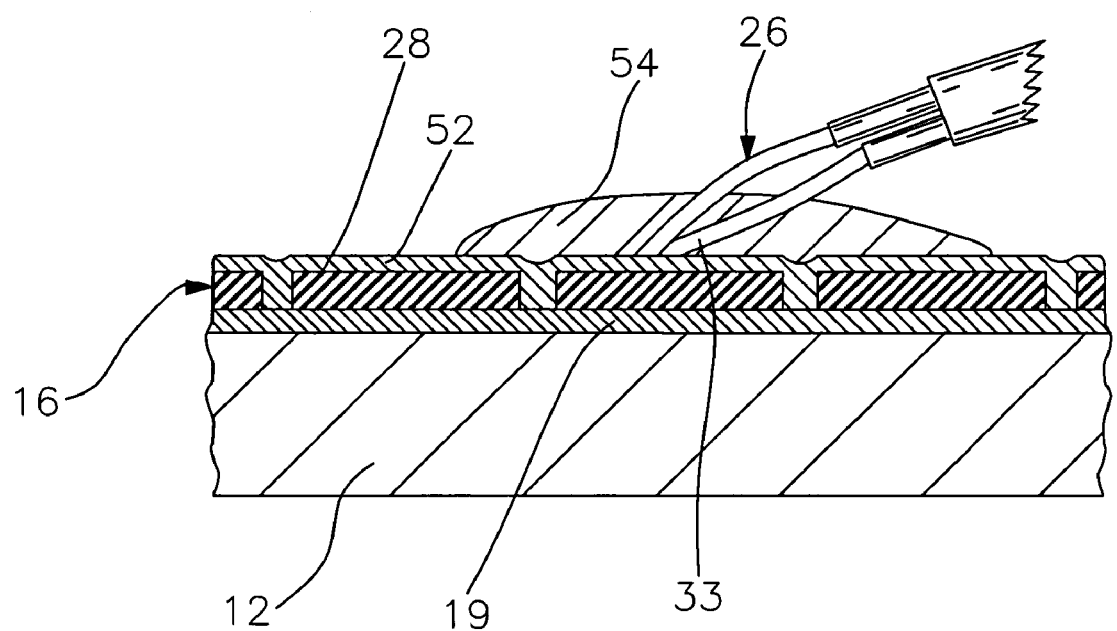
Figure 5:
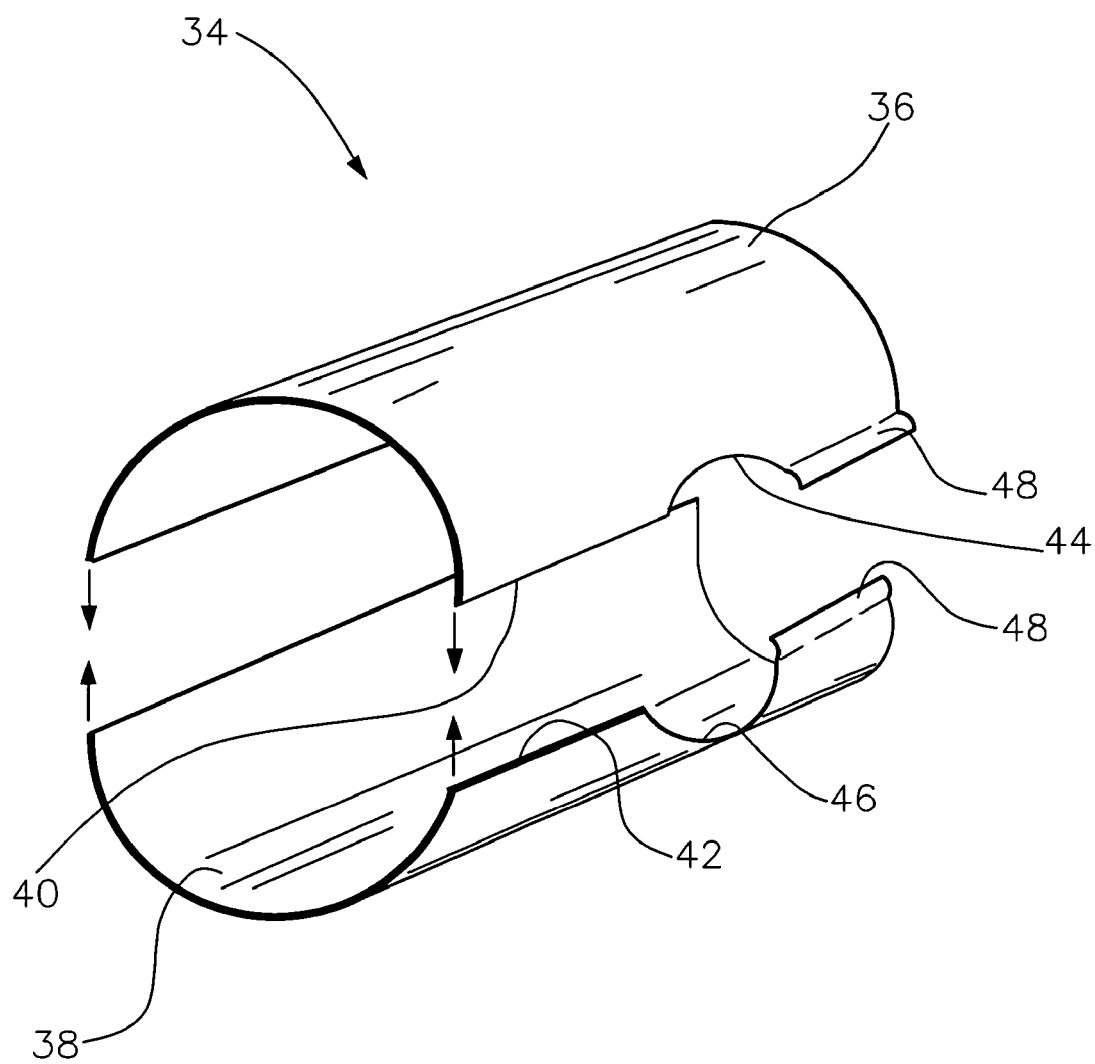
Figure 6:
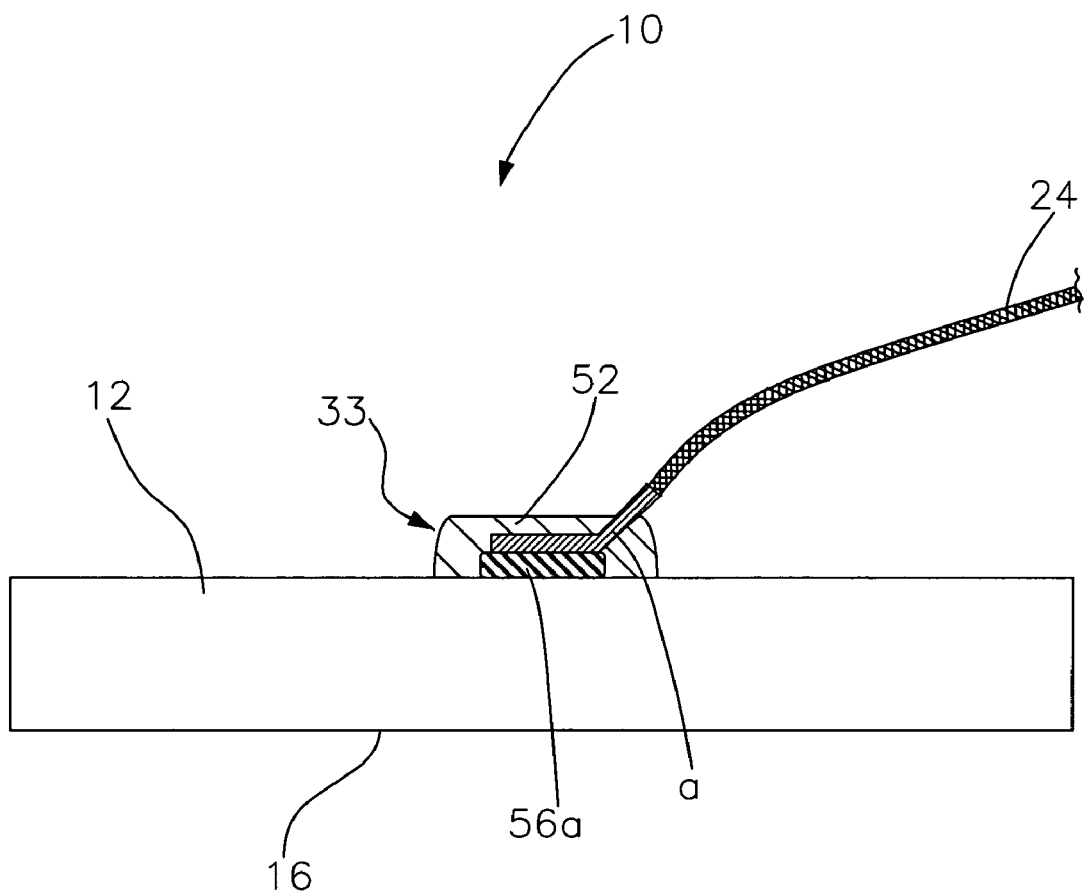
Figure 7:
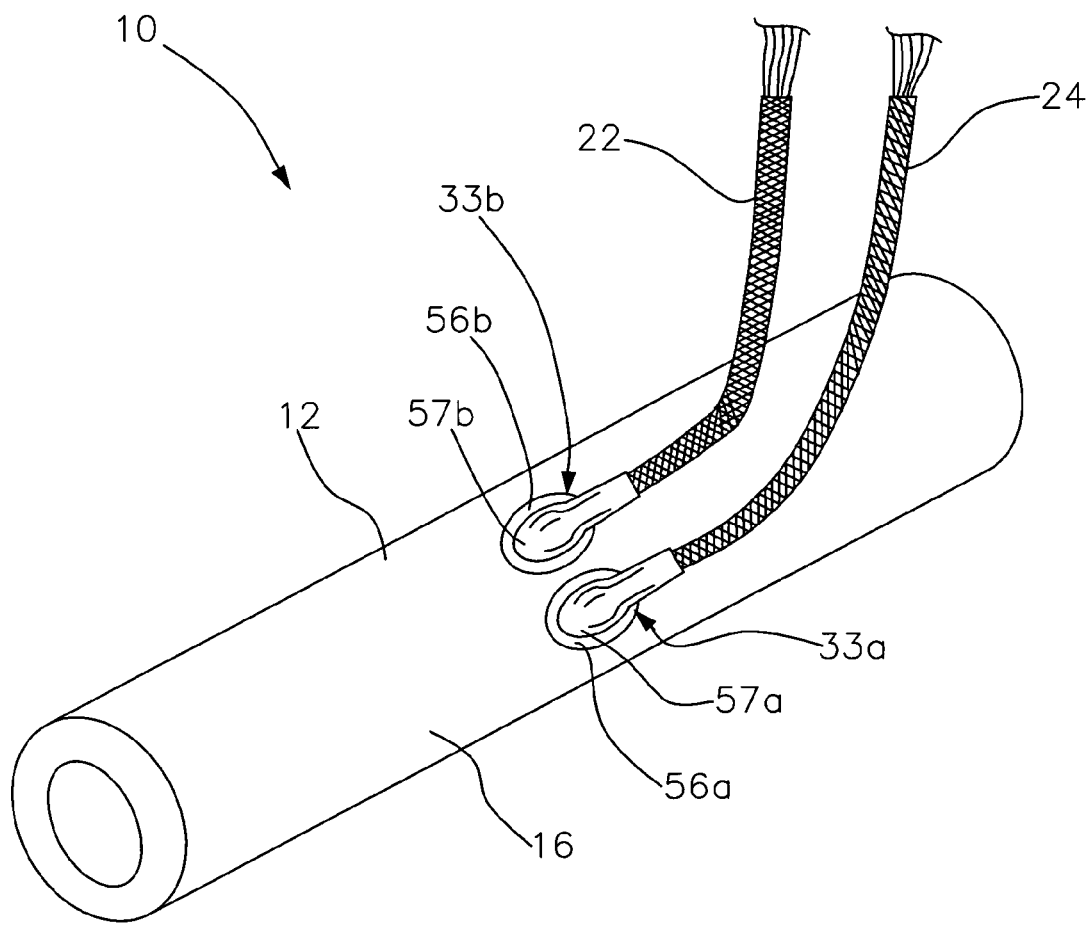
Figure 8:
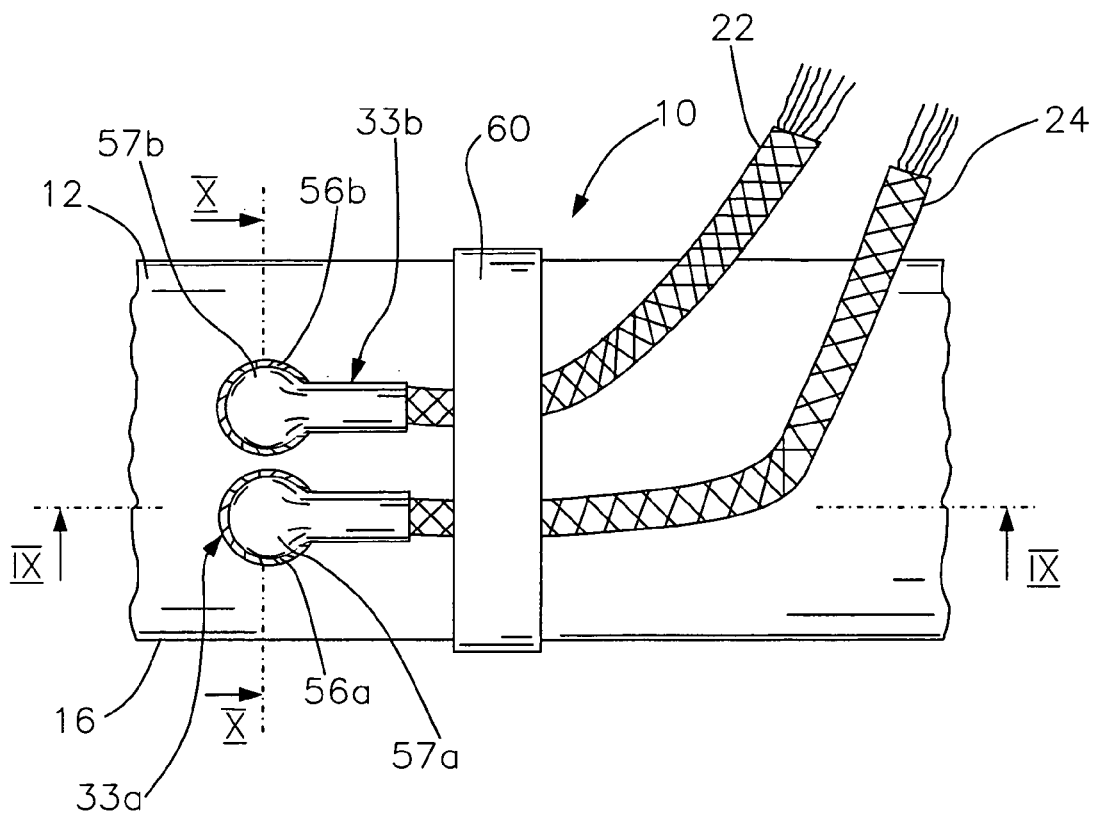
Figure 9:
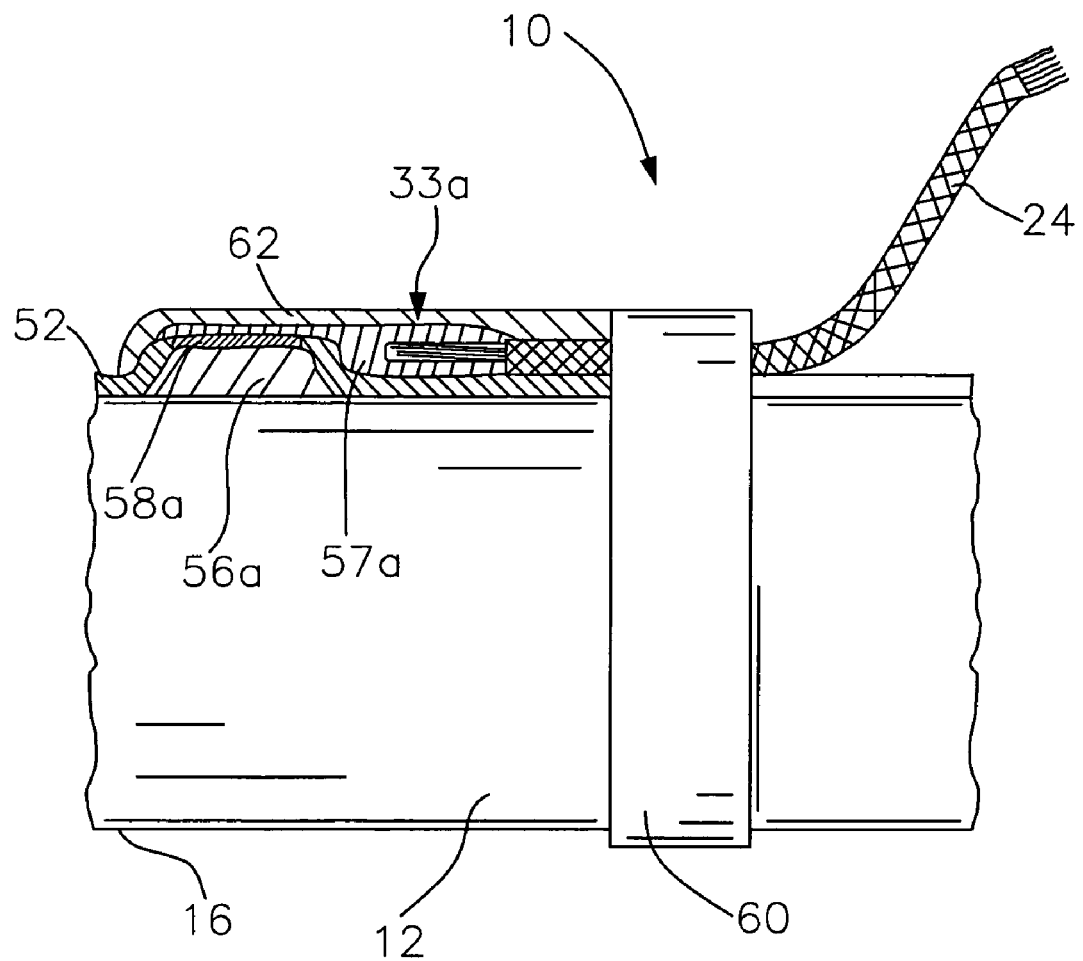

In the following particularly preferential embodiments of the present invention is described in more detail with respect to the attached drawings. The drawings show:

FIG. 1: a simplified perspective representation of a first execution of a as a plastic spray nozzle developed hot channel element with a surface heating layer, which is contacted by two electrical connection leads and a thermal-element;

FIG. 2: the region of the plastic spraying nozzle of FIG. 1, in that the connecting leads contact the heating layer;

FIG. 3: a cut through a contact point of a connecting lead with a heating layer from FIG. 2;

FIG. 4: a cut through a contact point of the thermal-elements with the heating layer;

FIG. 5: a perspective representation of a pipe clip, which is used in the production of the plastic spray nozzle of FIG. 1;

FIG. 6: a partial cut side view of a second execution of a hot channel element, which is contacted by two electrical connecting leads;

FIG. 7: a perspective representation of the hot channel element of FIG. 6;

FIG. 8: an increased top view of a region of the hot channel element of FIG. 6;

FIG. 9: a partial cut side view along the IX-IX line of FIG. 8; and

Figure 10:
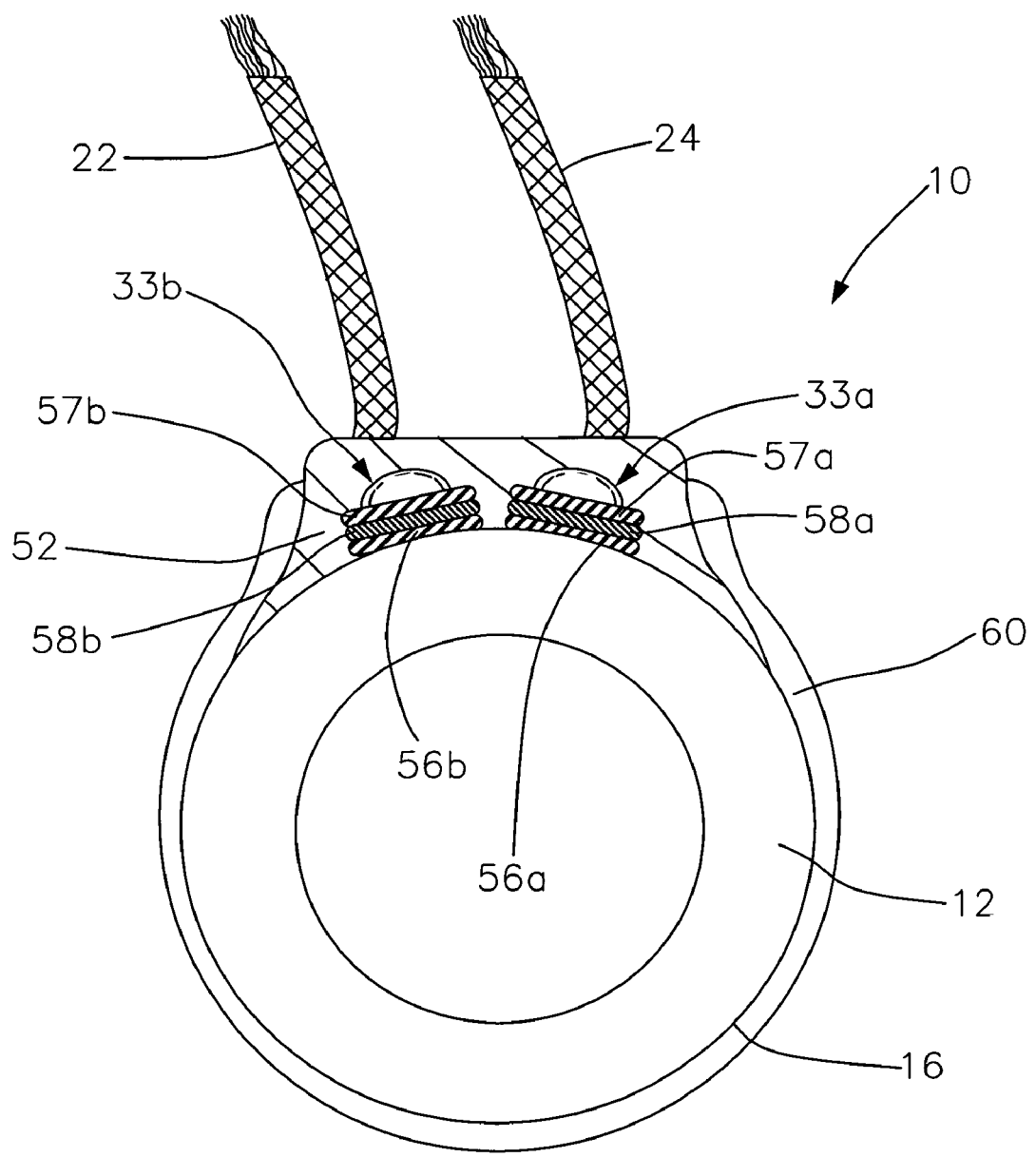

FIG. 10: a partial cut front view along the X-X line of FIG. 8.

DESCRIPTION OF THE EXECUTION EXAMPLES

In FIG. 1 a first hot channel element carries altogether the description mark 10. There we have a plastic spraying nozzle with a cylindrical pipe section 12 and a nozzle section 14. On pipe section 12 is a heating layer 16 which is thermal sprayed, its axial edges are suggested in FIG. 1 by doted lines. It is meander shaped, whereby the individual meander 17 of the heating layer 16 are shown for the sake of simplicity only in an axial middle region of the heating layer 16. Since the heating layer 16 relative to its width is much thinner, it can also be designated as a surface element.

The heating layer 16 is applied on the pipe section 12 by first thermal spraying an electrically conductive material on a laminar isolating intermediate layer 19. From this the created material layer still shows no desired shape and/or structure. Only thereafter is the material layer partially removed in such a manner, for example by means of lasers, that the electrically conductive resistance layer is created, which has the meander shape shown. An applicable procedure is described in DE 101 62 276 A1 publication of the applicant, to which's content is hereby expressly referred to.

At the two ends of the meander shaped heating layer 16 in each case contact areas 18 and 20 are developed. On these there are, as described below in more detail, Connecting leads 22 and 24 attached, which serve as the current supply for the heating layer 16. On the heating layer, which is likewise described in further detail below, the thermal-element 26 is indirectly fastened, which serves for the collection of the actual operating temperature of the heating layer 16.

The production of the contact between the lower connection lead 24 and the electrical heating layer 16 is described in greater detail with reference to the FIGS. 2 and 3 as well as 5.

First, at the end of the connecting leads 24 an isolation 30 is removed (preferably from mineral fiber or glass-silk), whereby cords 32 become free. These are then fanned out and are brought in as large of a contact area 20 as possible (the regions of the cords 32 which are at least approximate to the contact area 20 therefore create the attachment area 33).

The adjustment of the connecting leads 24 and the adjacent cords 32 can take place for example by means of the pipe clips 34 shown in FIG. 5. This exhibit's the two halves of 36 and 38, which cannot be illustrated interconnected any closer if drawn as in FIG. 5. The inside diameter of the pipe clip 34 is about the same for instance as the outside diameter of the pipe section 12 of the hot channel element 10.

The two halves of 36 and 38 point in each case at a free longitudinal edge 40 and/or 42 which is a semicircular recess 44 and/or 46. These are so dimensioned, that if the pipe clip 34 on the tubing section 12 is put on, the circular recess just leaves the contact area 20 formed by the two recesses 44 und 46 uncovered, a remaining region 47 of the heating layer 16, however, is covered by the pipe clip 34.

The in FIG. 5 to the right rear regions of the longitudinal edges 40 and 42 pointing regions are displayed somewhat radial outward. Thereby it becomes that, if the two halves of 36 and 38 of the pipe clip 34 on the tubing section 12 are placed together, a clamping section 48 is created, through which the connecting leads 24 and the thereby also attachment area 33 of the cords 32 are fixed during assembly of the hot channel element 10.

The rest of the attachment regions 33 of the cords 32 are placed by the contact surfaces 20 and the connecting lead 24 is fixed through the pipe clip 34, the attachment material 50 is thermal sprayed to attachment regions 33 of the cords 32 and the directly adjacent to the attachment area placed contact area 20.

With the mounting material 50 it deals with a metal powder, which is molten by thermal spraying and sprayed on the attachment regions 33 of the cords 32 and the contact area 20. It exhibits a higher, preferably an approximately 10 times better electrical conductivity than the material of the heating layer.

After solidifying of the attachment material 50 the attachment regions 33 of the cords 32 are enclosed with attachment material 50. Thereby they are attached in intimate contact with the contact area 20. When thermal spraying the surfaces of the cords 32 facing each other and the contact area 20 can easily melt, which ensures an additional anchorage of the attachment section 33 of the cords 32 to the contact surface 20.

After the attachment of the connecting lead 24 to contact surface 20 the heating layer 16 the pipe clip 34 is removed. Then the attachment material 50 and the heating layer 16 are thermal sprayed with a layer 52 from an isolating material. This way heating layer 16 as well as the region, in which the connection lead 24 is fastened to the contact area 20 of the heating layer 16, is covered and protected. Also a malfunctioning of the heating layer 16, for example due to a short-circuit, is avoided.

The thermal-element 26 is intended for the collection of the temperature of the heating layer 16, as mentioned initially. The procedure for its attachment is the same as the procedure for the attachment of the connection lead 24 at the contact area 20 of the heating layer 16, which is described in great detail above. That attachment region 33 forms through the spot-weld of the thermal-elements 26 and a directly connecting short section of the two element wires.

As follows from FIG. 4, the thermal-element 26 is however not in direct contact with the heating layer 16, since the thermal-element 26 is made by definition of an electrically conductive material, which would lead to short-circuit with the heating layer 16 if in direct contact. In order to avoid such a short-circuit, the thermal-element 26 is only fastened after the production of the isolating layer 52. If necessary a non-metallic material can also be used as an attachment material as long as it resembles the material of the isolating layer 52 (reference symbol 54 in FIG. 4). As a material for thermal-element 26 iron-constantan or nickel-chrome-nickel is preferably used.

In the FIGS. 6 to 10 a second execution form of a hot channel element 10 is shown. Such elements and regions carry, which exhibit equivalent functions to elements and regions as described in the previous execution examples, the same description marks. They are again not described in the greater detail. Furthermore, it shall be noted that for simplification purposes the representation of the heating layer in the FIGS. 6 to 10 are not shown in the detail.

With in the hot channel element 10 shown in FIGS. 6 to 10 the two connecting leads 22 and 24 are fastened in another way to the heating layer 16 than with the preceding execution example: First a covering element not shown in the figures is placed upon on the heating layer 16, which exhibits two circular to oval cut-outs, which arranged to the heating layer 16 in the region of the two contact surfaces (not shown in the FIGS. 6 to 10 in great detail).

Subsequently, an electrically conductive contact material is thermally sprayed on the contact areas of the heating layer

16, whereby two approximately 0,5 mm thick contact points 56a and 56b are created. Now a layer 52 from an isolating material is sprayed on the heating layer 16 and the two contact points 56a is and 56b, which is shown only for representation purposes in FIG. 9. Thereafter, the region of the contact points 56a and 56b and the layer 52 is again sanded off.

The attachment regions 33 of the two connection leads 22 and 24 are implemented as lugs 57a and 57b. They were welded by point welding 58a and/or 58b with a contact point 56a and/or 56b. For this an ordinary welding method can be used, whereby a separate attachment material can be used, or welding can take place by means of ultrasonic welding. There the two connection leads 22 and 24 are held by clamp-rings 60, which are organized in the art as a shell around the hot channel element 10. So that the appropriate lugs' 33 neighboring end of the connection lead 22 to 24 is clamped between the clamping ring 60 and the hot channel element 10. After the welding the lugs 57a and 57b with the contact point 56a and 56b the lugs 57a and 57b and their surroundings are poured with an electrically isolating material 62.

The invention claimed is:

1. A method for attachment of an electrical lead wire to a surface element comprising:
    fanning out cord of the electrical lead wire;
    preparing an attachment area for the cords of the lead wire at least indirectly on the surface element; and
    thermally spraying the lead wire to the attachment area with an attachment material.

2. The method according to claim 1, wherein the surface element is an electrically conductive layer selected from a group consisting of a heating layer and a cooling layer, and the attachment area is electrically connected with the electrically conductive layer.

3. The method according to claim 2, wherein the attachment material comprises an electrical conductivity from approximately five to approximately ten times higher than an electrical conductivity of the electrically conductive layer.

4. The method according to claim 2 further comprising an electrically isolating layer applied to the electrically conductive layer by thermal spraying.

5. The method according to claim 4, wherein the thermal spraying comprises plasma spraying.

6. The method according to claim 1, wherein an electrically isolating layer is applied over the attachment area and the lead wire.

7. A method for attachment of an electrical lead wire to a surface element comprising:
    thermally spraying a contact material onto a surface of the surface element to create a contact point; and
    welding the lead wire to the contact point,
    wherein the surface element is an electrically conductive layer selected from a group consisting of a heating layer and a cooling layer, and the contact point is electrically connected with the electrically conductive layer.

8. A method for attachment of an electrical lead wire to a surface element comprising:
    thermally spraying a contact material onto a surface of the surface element to create a contact point; and
    welding the lead wire to the contact point,
    wherein an electrically isolating layer is applied over the contact point and the lead wire.

9. A heating device comprising a heating layer and an electrical lead wire connected at an attachment area, the electrical lead wire comprising fanned out cords that are secured to the attachment area by thermal sprayed attachment material.

10. The heating device according to claim 9 further comprising an electrically isolating layer applied to the heating layer and the attachment area.

11. The heating device according to claim 9 further comprising a clamping ring, wherein the electrical lead wire is clamped between the clamping ring and the heating layer.

* * * * *